(12) United States Patent
Schroder et al.

(10) Patent No.: US 8,984,893 B2
(45) Date of Patent: Mar. 24, 2015

(54) SYSTEM AND METHOD FOR AUGMENTING GAS TURBINE POWER OUTPUT

(71) Applicant: General Electric Company, Schenectady, NY (US)

(72) Inventors: Mark Stewart Schroder, Greenville, SC (US); Thomas Edward Wickert, Greenville, SC (US); Mark Allan Hadley, Greer, SC (US)

(73) Assignee: General Electric Company, Schenectady, NY (US)

( * ) Notice: Subject to any disclaimer, the term of this patent is extended or adjusted under 35 U.S.C. 154(b) by 60 days.

(21) Appl. No.: 13/859,819

(22) Filed: Apr. 10, 2013

(65) Prior Publication Data

US 2014/0305127 A1 Oct. 16, 2014

(51) Int. Cl.
*F02C 6/16* (2006.01)
*F02C 3/04* (2006.01)
*F02C 6/08* (2006.01)

(52) U.S. Cl.
CPC ...... *F02C 3/04* (2013.01); *F02C 6/08* (2013.01); *F02C 6/16* (2013.01); *Y02E 60/15* (2013.01)
USPC .......................................................... 60/772

(58) Field of Classification Search
CPC ................ F02C 6/14; F02C 6/16; F02C 6/08; Y02E 60/15
USPC ..................... 60/726, 727, 782, 785, 772, 659
See application file for complete search history.

(56) References Cited

U.S. PATENT DOCUMENTS

| 4,281,256 | A | * | 7/1981 | Ahrens et al. ................. 290/1 R |
|---|---|---|---|---|
| 5,934,063 | A | | 8/1999 | Nakhamkin |
| 6,038,849 | A | | 3/2000 | Nakhamkin et al. |
| 6,134,873 | A | | 10/2000 | Nakhamkin et al. |
| 6,244,037 | B1 | | 6/2001 | Nakhamkin et al. |
| 6,305,158 | B1 | | 10/2001 | Nakhamkin et al. |
| 6,530,224 | B1 | | 3/2003 | Conchieri |
| 6,848,259 | B2 | | 2/2005 | Kelller-Sornig et al. |
| 8,011,189 | B2 | | 9/2011 | Nakhamkin |
| 2003/0033812 | A1 | | 2/2003 | Gerdes et al. |
| 2008/0178602 | A1 | | 7/2008 | Nakhamkin |
| 2010/0189551 | A1 | * | 7/2010 | Ballard et al. ................. 415/175 |
| 2011/0094231 | A1 | * | 4/2011 | Freund ............................. 60/727 |
| 2011/0094236 | A1 | * | 4/2011 | Finkenrath et al. ............. 60/772 |
| 2012/0023960 | A1 | * | 2/2012 | Minto ............................. 60/772 |

OTHER PUBLICATIONS

Second Generation of CAES Technology-Performance, Operations, Economics, Renewable Load Management, Green Energy, Nakhamkin, et al., Power-Gen International, Dec. 8-10, 2009, 12 pages, Las Vegas, NV.
Power Augmentation using Air Injection, an Alternative solution to Peak Power Demands-using the large installed base of existing GT & CC power plants, Dr. Rodney R. Gay, et al., Electric Power 2007 Conference, 14 pages.
150, 300, 400 MW CAES Plants Based on Various Combustion Turbines, Energy Storage & Power Consultants, LLC, DR. Nakhamkin et al., 6 pages.
Available Compressed Air Energy Storage CAES Plant Concepts, Dr. Michael Nakhamkin, et al., www.espcinc.com/library/PowerGen 2007 paper.
New Solutions for Energy Storage and Smart Grid Load Management, Victor de Blasi, Gas Turbine World, Mar.-Apr. 2009, vol. 39 No. 2, pp. 22-26.

* cited by examiner

*Primary Examiner* — William H Rodriguez
*Assistant Examiner* — Thomas Burke
(74) *Attorney, Agent, or Firm* — Dority & Manning, PA

(57) ABSTRACT

A system for augmenting gas turbine power output includes a compressed air supply, and a compressed air storage plenum in fluid communication with the compressed air supply. The compressed air storage plenum is configured to store a compressed air from the compressed air supply for later use. The system further includes an inlet plenum sealingly coupled to an inlet of the gas turbine. The inlet plenum is in fluid communication with the compressed air storage plenum so as to route the compressed air from the compressed air storage plenum into the inlet of the compressor during augmented operation of the gas turbine.

18 Claims, 6 Drawing Sheets

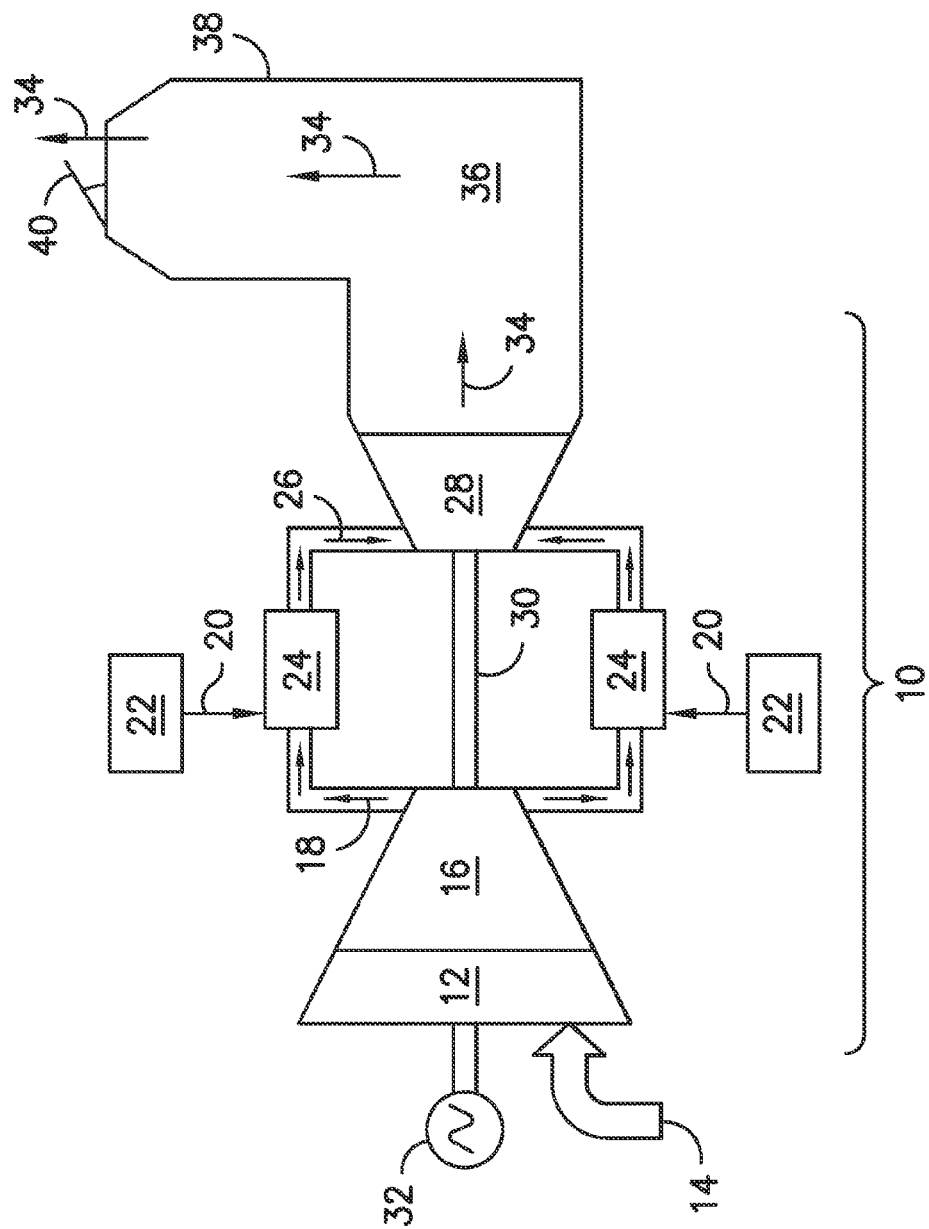
FIG. -1-
PRIOR ART

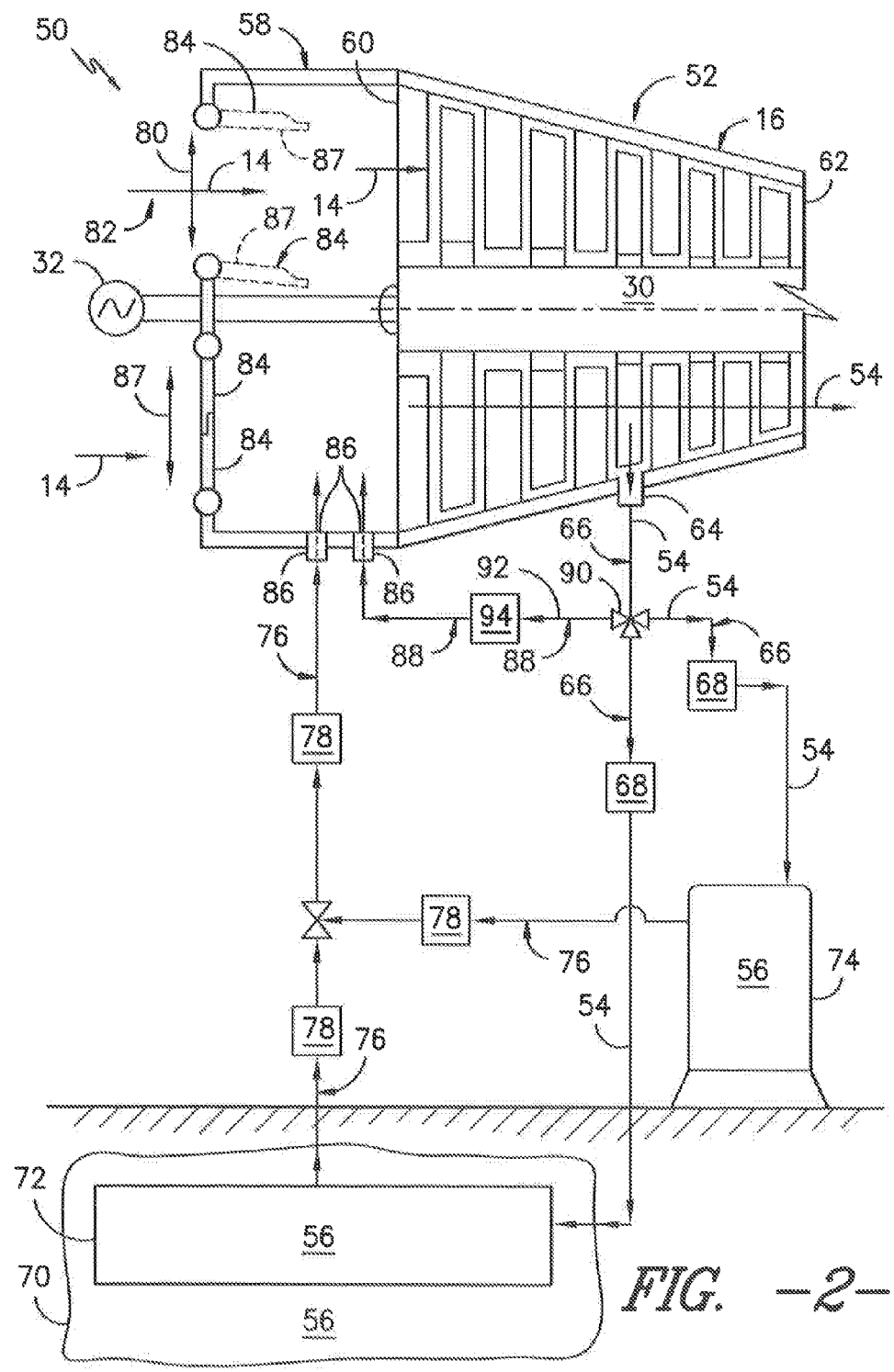
FIG. -2-

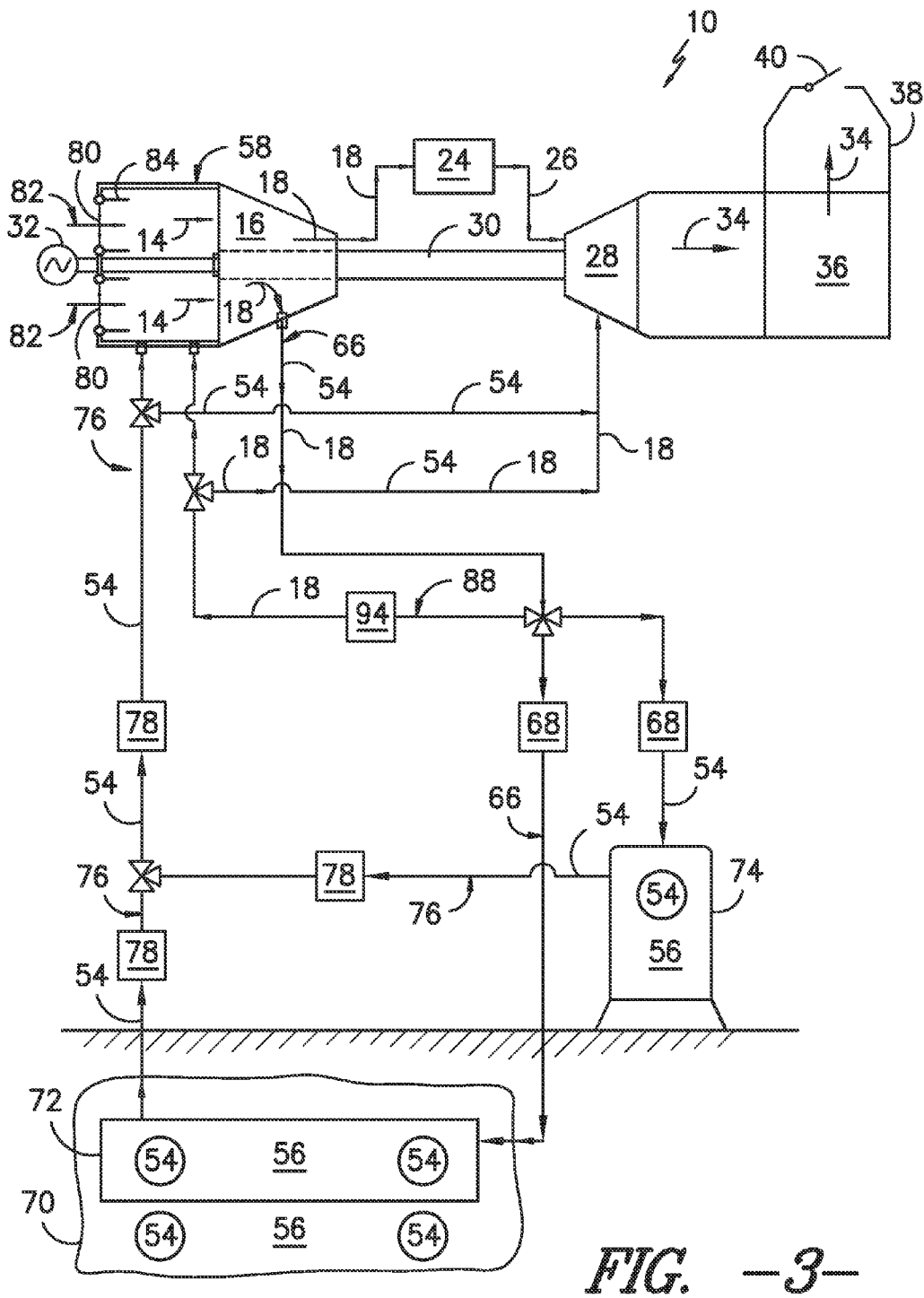
FIG. -3-

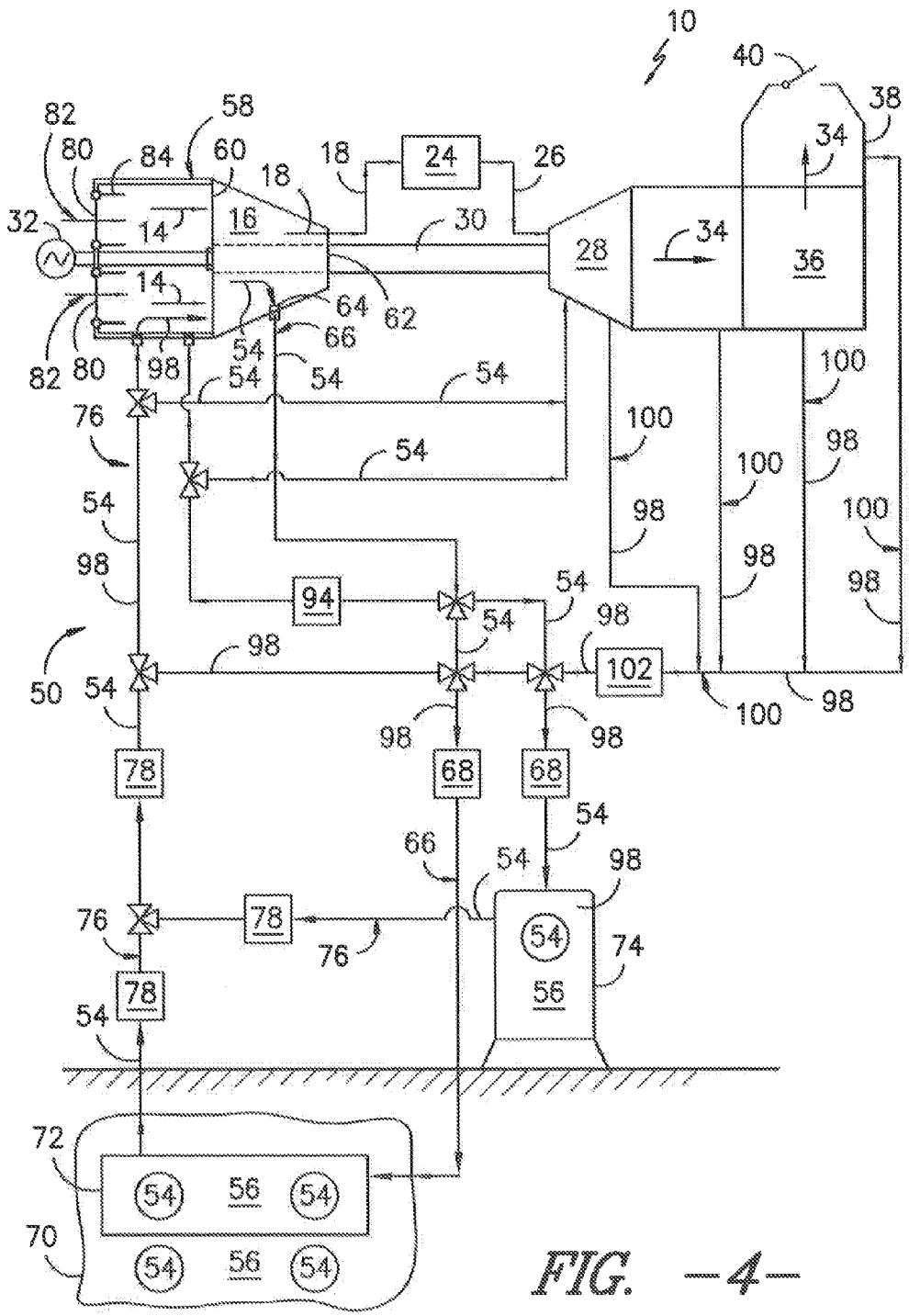
FIG. -4-

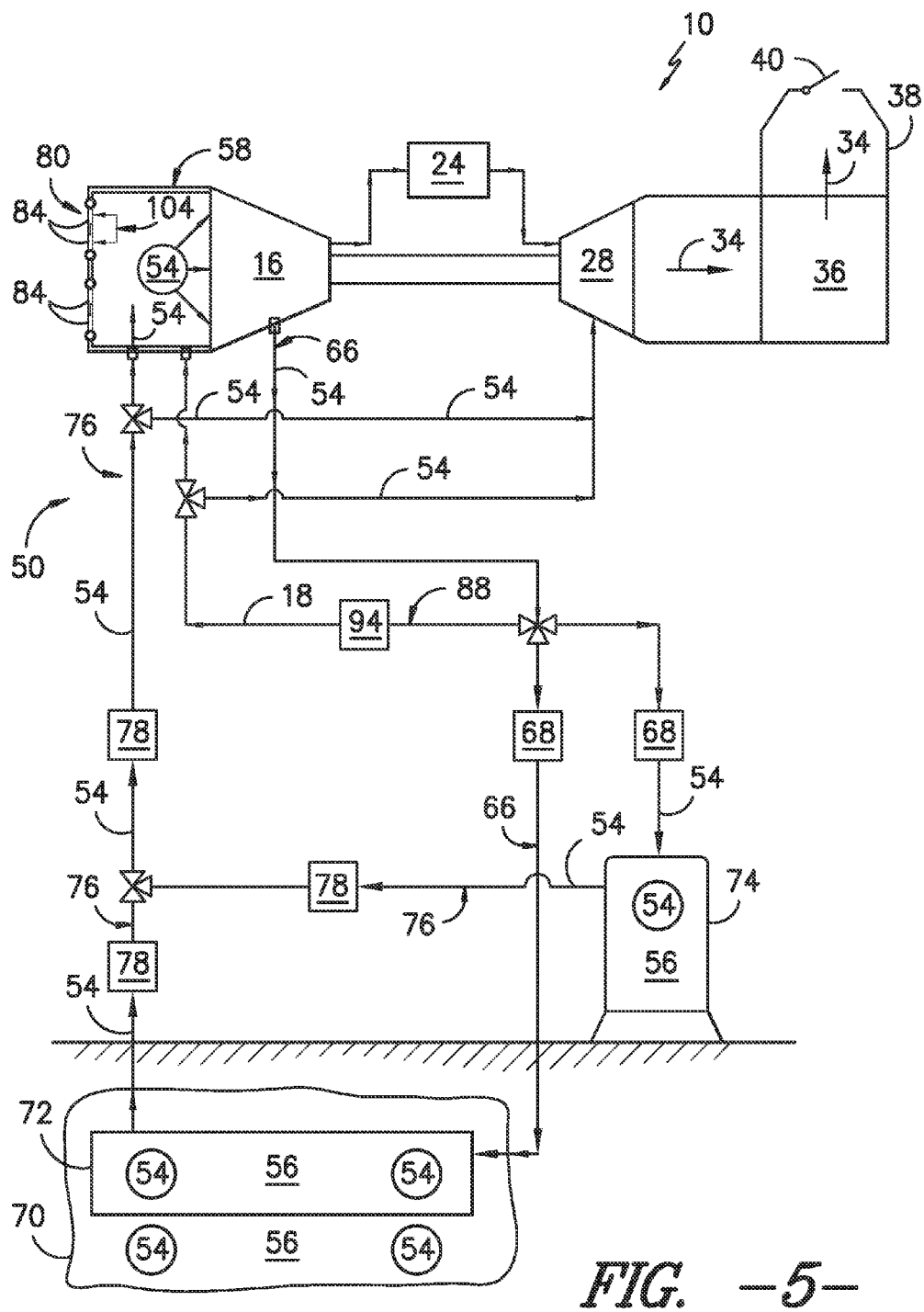
FIG. -5-

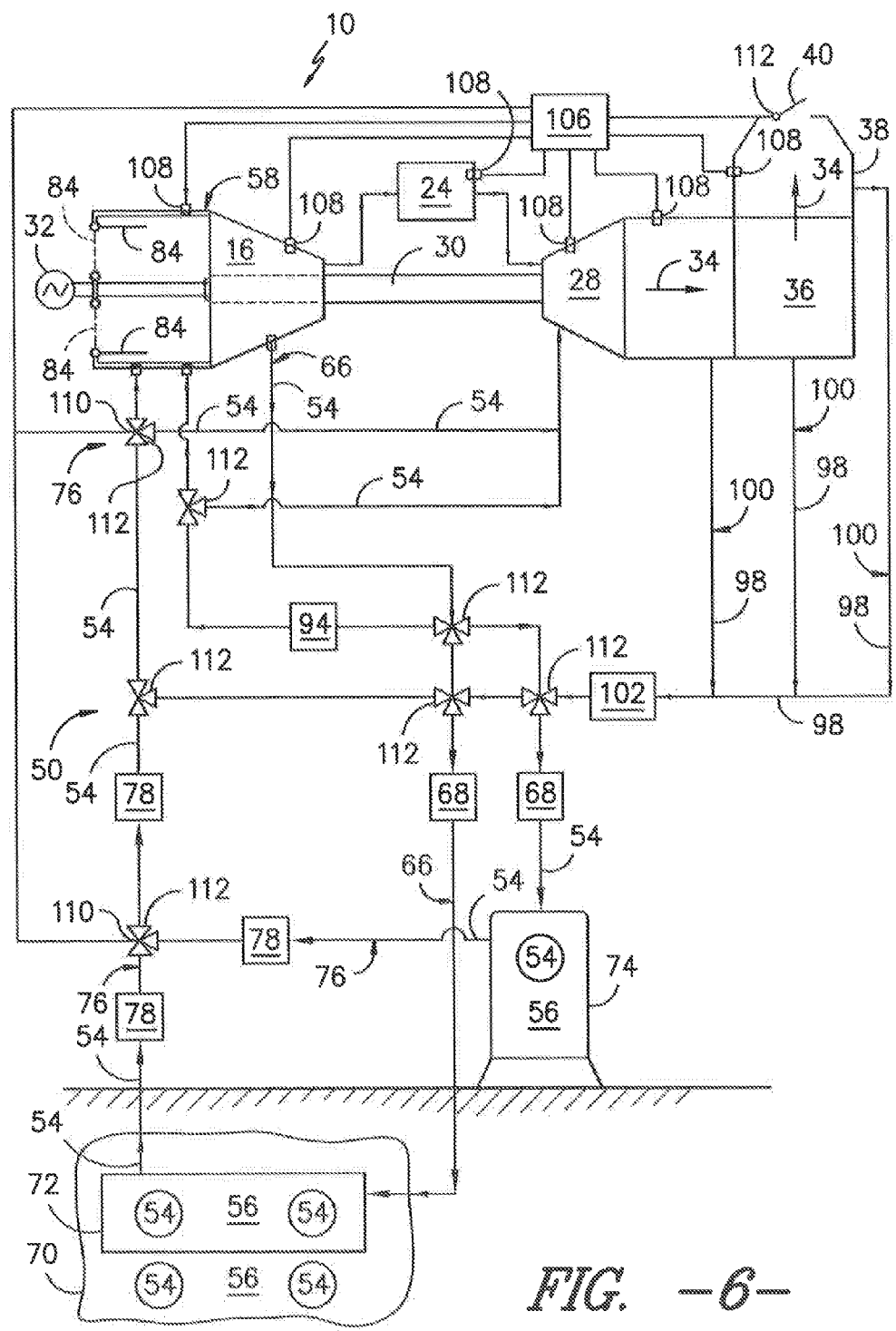
FIG. -6-

SYSTEM AND METHOD FOR AUGMENTING GAS TURBINE POWER OUTPUT

FIELD OF THE INVENTION

The present disclosure relates generally to a system and a method for augmenting performance of a gas turbine. More particularly, this disclosure includes a system and a method for pressurizing an inlet plenum of the gas turbine.

BACKGROUND OF THE INVENTION

A typical power generation plant includes a gas turbine having an axial compressor that feeds compressed air to a plurality of combustors. The compressed air is mixed with a fuel to form a combustible mixture within each combustor. The mixture is burned, thereby producing a rapidly expanding hot gas. The hot gas is routed through a hot gas path and into an expansion turbine.

As the hot gas flows through the turbine, kinetic energy is transferred to one or more rows or stages of turbine blades which are coupled to a shaft that extends axially through the gas turbine, thereby causing the shaft to rotate. The hot gas is exhausted from the gas turbine through an exhaust gas diffuser. The shaft drives the compressor to sustain operation of the gas turbine. A generator/electric motor is coupled to the shaft upstream from an inlet of the compressor. The generator converts the rotational movement of the shaft into electricity. The generator/electric motor drives the compressor during start-up of the gas turbine.

Because the gas turbine is an air breathing engine, output of the gas turbine is affected by anything that affects the density of the air entering the compressor. For example, power plant site conditions such as ambient air temperature, barometric pressure (i.e. site elevation) and relative humidity contribute to overall gas turbine output. Gas turbines are generally designed to operate at a reference temperature of approximately 59 degrees Fahrenheit, an atmospheric pressure of approximately 14.7 psia and a relative humidity of approximately 60%. However, few power plant sites realize these reference conditions during an entire day or throughout the year. In addition, most sites require that air filtration equipment, silencing devices, evaporative coolers or chillers be placed at the inlet of the compressor, thereby causing pressure losses within the gas turbine system. As a result, power output of the gas turbine is decreased.

Various systems have been employed to augment/optimize power plant efficiency in order to accommodate for non-reference temperature and pressure operating conditions. For example, one such system injects compressed air from a compressed air storage system, such as an underground cavern or other containment vessel, into the combustion section of the gas turbine, particularly during peak operation/demand. Generally, the compressed air storage system is charged or pressurized with compressed air from a secondary compressor driven by a motor during off peak periods of operation. One issue with this system is the additional costs associated with installing and maintaining a separate compression system to pressurize the compressed air storage system.

Although overall power plant output is increased and overall heat rate is decreased by utilizing compressed air injection into the combustion section of the gas turbine, operators continue to seek new ways to further increase power plant output while at the same time reducing costs. Therefore, an improved system and method for augmenting or improving overall power plant efficiency would be useful.

BRIEF DESCRIPTION OF THE INVENTION

Aspects and advantages of the invention are set forth below in the following description, or may be obvious from the description, or may be learned through practice of the invention.

One embodiment of the present invention is a system for augmenting gas turbine power output includes a compressed air supply, and a compressed air storage plenum in fluid communication with the compressed air supply. The compressed air storage plenum is configured to store a compressed air from the compressed air supply for later use. The system further includes an inlet plenum sealingly coupled to an inlet of the gas turbine. The inlet plenum is in fluid communication with the compressed air storage plenum so as to route the compressed air from the compressed air storage plenum into the inlet of the compressor during augmented operation of the gas turbine.

Another embodiment of the present invention is a gas turbine. The gas turbine generally includes an inlet plenum, a compressor downstream from the inlet plenum, a combustor downstream from the compressor, a turbine downstream from the combustor and an exhaust gas section downstream from the turbine. The compressor includes at least one extraction port. A compressed air storage plenum is in fluid communication with the compressor, and an inlet pressurization flow path provides for fluid communication between the compressed air storage plenum and the inlet plenum such that the inlet plenum receives the compressed air from the compressed air storage plenum to pressurize the inlet plenum during augmentation mode of operation of the gas turbine.

Another embodiment of the present invention includes a method for operating a gas turbine. The method includes compressing air within a compressor of the gas turbine and routing the compressed air to a compressed air storage plenum during a pressurization mode of operation of the gas turbine. The method further includes routing the compressed air to an inlet plenum disposed upstream from an inlet to the compressor and pressuring the inlet plenum with the compressed air. The method further includes routing the compressed air through the inlet into the compressor during an augmentation mode of operation of the gas turbine.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 illustrates a working schematic of an exemplary gas turbine as may be used with the present invention;

FIG. 2 illustrates a working schematic of a system for augmenting gas turbine power output of a gas turbine as shown in FIG. 1, according to at least one embodiment of the present disclosure;

FIG. 3 illustrates a working schematic of the gas turbine and the system for augmenting gas turbine power output, during a normal mode of operation, according to at least one embodiment of the present disclosure;

FIG. 4 illustrates a working schematic of the gas turbine and the system for augmenting gas turbine power output as shown in FIG. 3, during a pressurization mode of operation, according to at least one embodiment of the present disclosure;

FIG. 5 illustrates a working schematic of the gas turbine and the system for augmenting gas turbine power output as shown in FIG. 3 during an augmentation mode of operation, according to at least one embodiment of the present disclosure; and FIG. 6 illustrates a working schematic of the gas turbine and the system for augmenting gas turbine power output as shown in FIG. 3 including a controller, according to at least one embodiment of the present disclosure.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and a method for enhancing and/or augmenting the power output and/or performance of a gas turbine. The system generally includes an inlet plenum disposed upstream from an inlet of a compressor of the gas turbine. The inlet plenum includes one or more doors or hatches which may be closed during various operational modes of the gas turbine so as to seal the inlet plenum from the surrounding environment. The system further includes an extraction air flow path that provides for fluid communication between the compressor and a compressed air storage plenum. An inlet pressurization flow path provides for fluid communication between the compressed air storage plenum and the inlet plenum. In particular embodiments, the compressed air storage plenum may be at least partially defined by a geologically formed cavern and/or a manufactured pressure vessel.

During off peak operation, an electric motor or other device such as the generator, may drive the compressor to produce the compressed air. A portion of the compressed air is extracted from the compressor and is routed through the extraction air flow path to the compressed air storage plenum. The extraction location from the compressor may be determined based on the pressure required to route the compressed air to the compressed air storage plenum without further compression from an external compressor. For example, extraction at a point or stage of the compressor that is closer to the outlet or to the combustor results in a higher pressure of the compressed air than extraction at a point that is closer to the inlet of the compressor.

During various gas turbine operating conditions or modes, the one or more doors or hatches of the inlet plenum are closed, thereby sealing the inlet plenum. The compressed air from the compressed air storage plenum is routed along the inlet pressurization flow path and is injected or fed into the inlet plenum, thereby providing a pressurized inlet plenum. The compressed air is then routed from the pressurized inlet plenum into the inlet of the compressor. As a result, pressure losses normally associated with passing ambient inlet air through various filtration or other conditioning devices is reduced or eliminated, thus increasing the pressure through the compressor and enhancing the overall performance of the compressor, the gas turbine and/or the power plant facility.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18 at a highly energized state.

The compressed working fluid 18 is mixed with a fuel 20 from a fuel supply 22 to form a combustible mixture within one or more combustors 24. The combustible mixture is burned to produce combustion gases 26 having a high temperature and pressure. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust stack 38 may include an exhaust cap or hatch 40 that may be opened or closed during various operational modes of the gas turbine 10 to control a flow of the exhaust gases 34 to the environment. The exhaust section 36 may include, for example, a heat recovery steam generator (not shown) for cleaning and extracting additional heat from the exhaust gases 34 prior to release to the environment.

FIG. 2 provides a functional block diagram of a system 50 for enhancing and/or augmenting the performance of the gas turbine 10. As shown in FIG. 2, the system 50 generally includes a compressed air supply 52 for providing a flow of compressed air 54 to at least one compressed air storage plenum 56 herein referred to as "storage plenum 56", and a inlet plenum 58 that is sealing engaged to an inlet 60 of the compressor 16. As used herein, the term "normal mode" corresponds to an operational mode of the gas turbine 10 wherein air entering the inlet 60 of the compressor 16 of the gas turbine 10 is at an ambient atmospheric pressure. The term "pressurization mode" corresponds to an operational mode of the system 50 wherein the compressed air supply such as the compressor 16 of the gas turbine 10 is driven by a motor or other device to generate the compressed air 54. The term "augmented mode" corresponds to an operational mode of the system 50 in which the compressed air 54 enters the inlet 60 of the compressor 16 from the inlet plenum 58 at a pressure that is greater than ambient atmospheric pressure.

In one embodiment, the compressed air supply 52 includes the compressor 16 of the gas turbine 10. The compressor 16 generally includes an outlet 62 that is disposed downstream from the inlet 60. An extraction port 64 provides for fluid communication out of the compressor 16. The extraction port 64 may be disposed at any axial location along the compressor 16 between the inlet 60 and the outlet 62. The location of the extraction port may be determined based on a pressure required to provide the compressed air 54 to the storage plenum 56 without further compression from an external compressor.

In one embodiment, an extraction air flow path 66 is defined between the extraction port 64 and the storage plenum 56. The extraction air flow path 66 provides for fluid communication between the compressor 16 and the storage plenum 56. The extraction air flow path 66 may be at least partially defined by one or more fluid couplings such as pipes, valves and/or flow distribution manifolds. In particular embodiments, at least one flow conditioning device 68 such as a throttle valve, a recuperator, a heat exchanger or a chiller may be disposed between the compressed air supply 52 and the storage plenum 56. The flow conditioning device 68 may be used to control a flow rate, to extract thermal energy and/or to add thermal energy to the compressed air 54 as it flows between the compressed air supply 52 such as the compressor 16 and the storage plenum 56. In addition or in the alternative, the flow conditioning device 68 may be used to increase and/or decrease pressure within the extraction air flow path 66 before introducing the compressed air 54 into the storage plenum 56.

The storage plenum 56 may comprise of any tank, vessel or any other storage device suitable to receive and store a sufficient volume of the compressed air 54 for later as disclosed herein. For example, the storage plenum 56 may comprise at least one of an underground geologically formed cavern 70, a below ground pressure vessel 72 or an above ground pressure vessel 74.

An inlet pressurization flow path 76 is defined between the storage plenum 56 and the inlet plenum 58 to route the compressed air 54 from the storage plenum 56 to the inlet plenum 58 during augmented mode operation of the gas turbine 10. The inlet pressurization flow path 76 may be at least partially defined by one or more fluid couplings such as pipes, valves or flow distribution manifolds. In particular embodiments, the inlet pressurization flow path 76 includes at least one flow conditioning device 78 such as a throttle valve, a recuperator, a heat exchanger or a chiller. The flow conditioning device 78 may be disposed at any point along the inlet pressurization flow path 76. The flow conditioning device 78 may be used to control a flow rate, to extract thermal energy and/or to add thermal energy to the compressed air 54 as it flows between the storage plenum 56 and the inlet plenum 58. In addition or in the alternative, the flow conditioning device 78 may be used to further increase and/or to decrease pressure within the inlet pressurization flow path 76 before introducing the compressed air 54 into the inlet plenum 58.

In particular embodiments, as shown in FIG. 2 the inlet plenum 58 includes at least one opening 80. The opening generally 80 defines a flow path 82 for the ambient air 14 to enter the inlet plenum 58 during particular operating modes of the gas turbine 10 such as during normal mode operation of the gas turbine 10 and during pressurization mode operation of the system 50. A series of filters, cooling coils, moisture separators, and/or other devices (not shown) may be disposed upstream and/or downstream from the opening 80 to purify and otherwise condition the ambient air 14 entering the inlet plenum 58.

In various embodiments, the inlet plenum 56 includes one or more doors or hatches 84 disposed at the opening 80. The one or more hatches 84 may rotate as shown, or slide (not shown) between an open position as illustrated by dashed lines and a closed or sealed position 87 as illustrated with solid lines. In the open position, the hatches 84 allow the ambient air to flow into the inlet plenum 58. In the closed position, the hatches 84 at least partially seal the opening to prevent leakage of the compressed air 54 from the inlet plenum 58 during augmented mode operation. In particular embodiments, as shown in FIG. 2 the hatches 84 are arranged to open inward into the inlet plenum 56. The hatches 84 may comprise of multiple louvered hatches or any other sealable opening cover suitable for providing a substantially airtight seal around the opening 80 of the inlet plenum 58. One or more seals (not shown) may be disposed at least partially around the door(s) 84 to sealingly engage the door(s) 84 to the inlet plenum 56. In addition or in the alternative, one or more seals may be disposed between the door(s) 84 such as in a lap joint formed between two adjacent door(s) 84 to provide a seal between the door(s) 84 and/or the inlet plenum 56 to allow for pressurization of the inlet plenum 58.

In particular embodiments, the inlet plenum 58 includes an inlet port 86. The inlet port 86 is in fluid communication with the inlet pressurization flow path 76, thereby providing for fluid communication between the compressed air storage plenum 56 and the inlet plenum 58. The inlet port 86 may comprise of various regulating and/or flow conditioning devices (not shown) such as injection nozzles and/or filters to regulate or condition the compressed air 54 entering the inlet plenum 58 from the storage plenum 56.

In particular embodiments, the system 50 includes a bleed air flow path 88 to provide for fluid communication between the compressed air supply 52, such as the compressor 16, and the inlet plenum 58. The bleed air flow path 88 may extend from a control valve 90 such as a three-way valve or flow distribution manifold disposed along the extraction air flow path 66 or may be fluidly connected directly to the compressor 16. The control valve 90 may be actuated between a fully open and a fully closed position during various operation modes of the system 50 and or the gas turbine 10 so as to control a flow of a bleed portion 92 of the compressed air 54. In particular embodiments, at least one flow conditioning device 94 such as a throttle valve, a recuperator, a heat exchanger or a chiller is disposed within the bleed air flow path 88. The flow conditioning device 94 may be used to control a flow rate, to extract thermal energy and/or to add thermal energy to the bleed air portion 92 of the compressed air 54 as it flows between compressor 16 and the inlet plenum 58. In addition or in the alternative, the flow conditioning device 94 may be used to further increase and/or to decrease the pressure of the bleed air portion 92 of the compressed air 54 prior to introduction into the inlet plenum 58.

FIGS. 3, 4 and 5 provide functional schematic views of the gas turbine 10 incorporating the system 50 for pressurizing the inlet plenum 58 in various operational modes according to various embodiments of the present invention. In particular, FIG. 3 provides a schematic of the gas turbine 10 operating in the normal mode, FIG. 4 provides a schematic of the system 50 and the gas turbine 10 operating in the pressurization mode, and FIG. 5 provides a schematic of the system 50 and the gas turbine 10 operating in the augmented mode.

During normal mode operation, as shown in FIG. 3, the hatches 84 are in an open position to allow the ambient air 14 to flow through the opening 80 along the flow path 82 and into the inlet plenum 58. The ambient air 14 is routed into the inlet 60 of the compressor 16. The ambient air 14 is compressed within the compressor 16 to provide the compressed working fluid 18 to the combustor 24. In particular operation modes, a portion of the compressed working fluid 18 may be routed through the bleed air flow path 88 back into the inlet plenum 58 for inlet air conditioning. In addition or in the alternative, a portion of the compressed working fluid 18 may be routed through the bleed air flow path 88 and into a cooling air flow path 66 that is in fluid communication with the turbine 28 to cool various turbine components. The remainder of the compressed working fluid 18 is mixed with the fuel 20 and burned to provide the combustion gases 26. The combustion gases flow through the turbine 28 and are exhausted as the exhaust gases 34 into the exhaust section, through the exhaust stack 38 and out of the exhaust cap 40 where they are discharged into the atmosphere.

As shown in FIG. 4, the system 50 may be engaged during various times such as during off-peak energy demand so as to pressurize the storage plenum 56. During pressurization mode operation the generator/motor 32 drives the compressor 16. The hatches 84 are at least partially open to allow the ambient air 14 to flow through the opening 80 along the flow path 82, through the inlet plenum 58 and into the inlet 60 of the compressor 16. The exhaust cap 40 may be closed or at least partially closed to the atmosphere. The ambient air 14 is progressively compressed as it passes through the compressor to produce the compressed air 54. At least some of the compressed air 54 is routed through the extraction port 64 and into the extraction air flow path 66. The compressed air 54 flows through the extraction air flow path 66 and into the storage plenum 56. The compressed air 54 may be heated, cooled or otherwise conditioned by the flow conditioning device 68 before flowing into the storage plenum 56.

During pressurization mode operation, excess compressed air 98 may flow from the outlet 62 of the compressor 16, through the combustor 24, through the turbine 28 and into the exhaust section 36 where it may be directed through an HRSG (if so equipped) and/or the exhaust stack 38. This may result in over pressurization of these components, particularly when the stack cap 40 is closed to the atmosphere. In order to prevent over pressurization within the various components of the gas turbine 10, the system 50 may further include one or more secondary bleed air flow paths 100. One or more flow conditioning devices 102 may be in fluid communication with the secondary bleed air flow paths 100. The flow conditioning device 102 may include a throttle valve, a control valve, a high pressure pump, an auxiliary compressor, a recuperator, a heat exchanger or a chiller or any other flow conditioning device. The flow conditioning device 102 may be used to control a flow rate, to extract thermal energy and/or to add thermal energy to the excess compressed air 98.

The excess compressed air 98 may be routed from one or all of the secondary bleed air flow paths 100 to the storage plenum 56 when the excess compressed air 98 is at a pressure that is at least slightly higher than the pressure within the storage plenum 56. If the pressure of the excess compressed air 98 is lower than the pressure within the storage plenum 56, the excess compressed air 98 may be routed to the inlet plenum 58 to be compressed again. The flow conditioning device 102 may be used to further increase and/or to decrease pressure of the excess compressed air 98 within the secondary bleed air flow paths 100 before introducing the excess compressed air 98 into the inlet plenum 58 and/or the storage plenum 56.

During augmented mode operation of the gas turbine 10, as shown in FIG. 5, such as during start-up or during peak demand, the hatches 84 to the inlet plenum 58 are closed, thereby sealing the inlet plenum 58. The compressed air 54 is routed from the storage plenum 56 through the inlet pressurization flow path 76 and into the inlet plenum 58, thereby pressurizing the inlet plenum 58. As a result, the compressed air 54 may exert an outward force 104 on the hatches 84, thereby compressing the seals (not shown) between the hatches 84 and/or the inlet plenum 58, thereby sealing the opening 80. The compressed air 54 pressurizes the inlet plenum 58 to a pressure that is above an ambient or local atmospheric pressure that surrounds the gas turbine 10. For example, in particular embodiments, the inlet plenum 58 could be pressurized between about 1.0 bar to about 2.0 bar. In particular embodiments, the inlet plenum 58 is pressurized to at least 1.0 bar or atmospheric conditions.

The compressed air 54 is then routed from the pressurized inlet plenum 58 into the compressor 16. As a result, the pressure of air entering the compressor 16 is increased. Additionally, pressure losses associated with filtration devices and/or other flow conditioning devices are reduced or eliminated. In addition, performance issues due to low density ambient air 14 (FIG. 1) found at higher elevations may be mitigated, thereby augmenting and/or enhancing the performance of the compressor 16 and/or the overall performance/efficiency of the gas turbine 10.

FIG. 6 provides a functional schematic view of the gas turbine 10 including the system 50 according to one embodiment of the present disclosure. As shown in FIG. 6 the system 50 may further include a controller 106. The controller may be in electronic communication with various sensors 108, flow control valves 110 and/or mechanical actuators 112 that are disposed at various locations within and around the gas turbine 10 and the system 50.

In one embodiment, the controller 106 is a General Electric SPEEDTRONIC™ Plant Control System (also known as DCS). The controller 106 may be a computer system having a processor(s) that executes programs to control the operation of the gas turbine using sensor inputs and instructions from human operators. Command signals generated by the controller 106 may cause the actuators 112 and/or the flow control valves 110 to perform various functions relating to the operation and control of the gas turbine 10 and/or the system 50.

In one embodiment, the controller 106 may receive a signal from at least one of the sensors 108 disposed within at least one of the compressor 16, the combustor 24, the turbine 28, the exhaust diffuser 34, the exhaust stack 38 or the inlet plenum 58 which corresponds to an over pressurization event. The controller 106 then generates a command signal based on the signal from the sensor(s) 108 to cause the mechanical actuators 112 and/or the flow control valves 110 to open and/or close to route the excess compressed air 98 (FIG. 5) through at least one of the secondary bleed air flow paths 100 (FIG. 5) of the extraction air flow path 66 so as to relive/prevent over pressurization, thereby preventing damage to the various components.

Various embodiments of the present disclosure, as shown in FIGS. 2, 3, 4, 5 and 6 may provide a method for operating the gas turbine in order to enhance and/or augment the gas turbine power output. The method generally includes compressing air within the compressor 16 of the gas turbine 10 and routing the compressed air 54 to the compressed air storage plenum 56 during the pressurization mode of operation of the gas turbine 10. The method further includes routing the compressed air 54 to the inlet plenum 58 disposed upstream from the inlet 60 to the compressor 16. The method further includes pressuring the inlet plenum 58 with the compressed air 54, and routing the compressed air 54 through the inlet 60 into the compressor 16 during an augmentation mode of operation of the gas turbine 10. The method may further include pressurizing the inlet plenum 58 to at least 1.0 bar. The method may further include routing a portion of the compressed 54 air directly from the compressor 16 to the inlet plenum 58 during the pressurization mode of operation. The method may further include routing a portion of excess compressed air 98 from a secondary bleed air flow path 100 to at least one of the compressed air storage plenum 56 or the inlet plenum 58 during the pressurization mode of operation.

This written description uses examples to disclose the invention, including the possible operation modes, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed is:

1. A system for enhancing performance of a gas turbine, the system comprising:
   a. a compressed air supply comprising a compressor of the gas turbine;
   b. a compressed air storage plenum in fluid communication with the compressed air supply, the compressed air storage plenum being configured to store a compressed air from the compressed air supply;
   c. an inlet plenum sealingly coupled to an inlet of the compressor, the inlet plenum being in fluid communication with the compressed air storage plenum and the inlet of the compressor, wherein the inlet plenum is pressurized with the compressed air from the compressed air storage plenum during augmented mode of operation of the gas turbine; and
   d. a bleed air flow path that extends between one of a to or an exhaust gas section of the gas turbine and the compressed air storage plenum, wherein the bleed air flow path provides for fluid communication between the turbine or the exhaust gas section and the compressed air storage plenum.

2. The system as in claim 1, wherein the inlet plenum is sealed to allow for pressurization.

3. The system as in claim 1, wherein the compressed air storage plenum comprises at least one of an underground geologically formed cavern, a below ground pressure vessel or an above ground pressure vessel.

4. The system as in claim 1, further comprising an extraction air flow path defined between the compressed air supply and the compressed air storage plenum and an inlet pressurization flow path defined between the compressed air storage plenum and the inlet plenum.

5. The system as in claim 4, further comprising at least one flow conditioning device disposed within at least one of the extraction air flow path or the inlet pressurization flow path.

6. The system as in claim 1, wherein the inlet plenum is pressurized by the compressed air to a pressure that is greater than an ambient atmospheric, pressure.

7. The system as in claim 1, wherein the inlet plenum is pressurized to a pressure of at least 1.0 bar.

8. A gas turbine, comprising:
   a. an inlet plenum, a compressor downstream from the inlet plenum, a combustor downstream from the compressor, a turbine downstream from the combustor and an exhaust gas section downstream from the turbine, the compressor having an extraction port;
   b. a compressed air storage plenum in fluid communication with the compressor;
   c. an inlet pressurization flow path that provides for fluid communication between the compressed air storage plenum and the inlet plenum, wherein the inlet plenum is pressurized with compressed air from the compressed air storage plenum during augmentation mode of operation of the gas turbine;
   d. a first bleed air flow path defined between the compressor and the inlet plenum, wherein the bleed air flow path provides for fluid communication between the compressor and the inlet plenum; and
   e. a secondary bleed air flow path fluidly connected to the gas turbine at a location downstream from the compressor, wherein the secondary bleed air flow path provides for fluid communication into the compressed air storage plenum.

9. The gas turbine as in claim 8, wherein the compressed air storage plenum comprises at least one of a geologically formed compressed air storage cavern or a pressure vessel.

10. The gas turbine as in claim 8, further comprising an extraction air flow path defined between an extraction port of the compressor and the compressed air storage plenum to route a compressed air from the compressor to the compressed air storage plenum.

11. The gas turbine as in claim 8, further comprising an inlet pressurization flow path defined between the compressed air storage plenum and the inlet plenum to route a compressed air from the compressed air storage plenum to the inlet plenum.

12. The gas turbine as in claim 8, further comprising one or more secondary bleed air flow paths that provide for fluid communication of compressed air from at least one of the combustor, the turbine and the exhaust gas section, to the inlet plenum.

13. The gas turbine as in claim 12, further comprising at least one flow conditioning device disposed within at least one of the one or more secondary bleed air flow paths.

14. The gas turbine as in claim 8, further comprising one or more secondary bleed air flow paths that provide for fluid communication of compressed air between the compressed air storage plenum and at least one of the turbine and the exhaust gas section.

15. A method for operating a gas turbine, comprising
   a. compressing air within a compressor of the gas turbine to provide a flow of compressed air through the gas turbine;
   b. routing the compressed air from the vas turbine at a location that is defined downstream from the compressor via one or more bleed air flow paths that provide for fluid communication between the gas turbine and a compressed air storage plenum during a pressurization mode of operation of the gas turbine;
   c. routing the compressed air from the compressed air storage plenum to an inlet plenum disposed upstream from an inlet to the compressor;
   d. sealing one or more openings of the inlet plenum;
   e. pressurizing the inlet plenum with the compressed air from the compressed air storage plenum; and
   f. routing the compressed air from the pressurized inlet plenum into the inlet of the compressor during an augmentation mode of operation of the gas turbine.

16. The method as in claim 15, wherein the inlet plenum is pressurized to at least 1.0 bar.

17. The method as in claim 15, further comprising routing a portion of the compressed air directly from the compressor to the inlet plenum during the pressurization mode of operation.

18. The method as in claim 15, further comprising routing a portion of excess compressed air from a secondary bleed air flow path to at least one of the compressed air storage plenum or the inlet plenum during the pressurization mode of operation.

\* \* \* \* \*

UNITED STATES PATENT AND TRADEMARK OFFICE
CERTIFICATE OF CORRECTION

| | | Page 1 of 1 |
|---|---|---|
| PATENT NO. | : 8,984,893 B2 | |
| APPLICATION NO. | : 13/859819 | |
| DATED | : March 24, 2015 | |
| INVENTOR(S) | : Schroder et al. | |

It is certified that error appears in the above-identified patent and that said Letters Patent is hereby corrected as shown below:

In the claims

Column 9, Claim 1, Line 37 reads "between one of a to or," should read
-- between one of a turbine or --

Column 9, Claim 6, Line 59 reads "than an ambient atmospheric, pressure." should read
-- than an ambient atmospheric pressure. --

Column 10, Claim 8, Line 10 reads "wherein the bleed air flow path" should read
-- wherein the first bleed air flow path --

Column 10, Claim 15, Line 47 reads "from the vas turbine" should read -- from the gas turbine --

Signed and Sealed this
Seventeenth Day of November, 2015

Michelle K. Lee
*Director of the United States Patent and Trademark Office*